Oct. 14, 1941.  D. C. ROCKOLA  2,259,177
PARKING METER
Filed July 12, 1937  2 Sheets-Sheet 1

Inventor:
David C. Rockola
By
Sheridan,
Davis & Cargill
Attys.

Oct. 14, 1941.     D. C. ROCKOLA     2,259,177
PARKING METER
Filed July 12, 1937     2 Sheets-Sheet 2
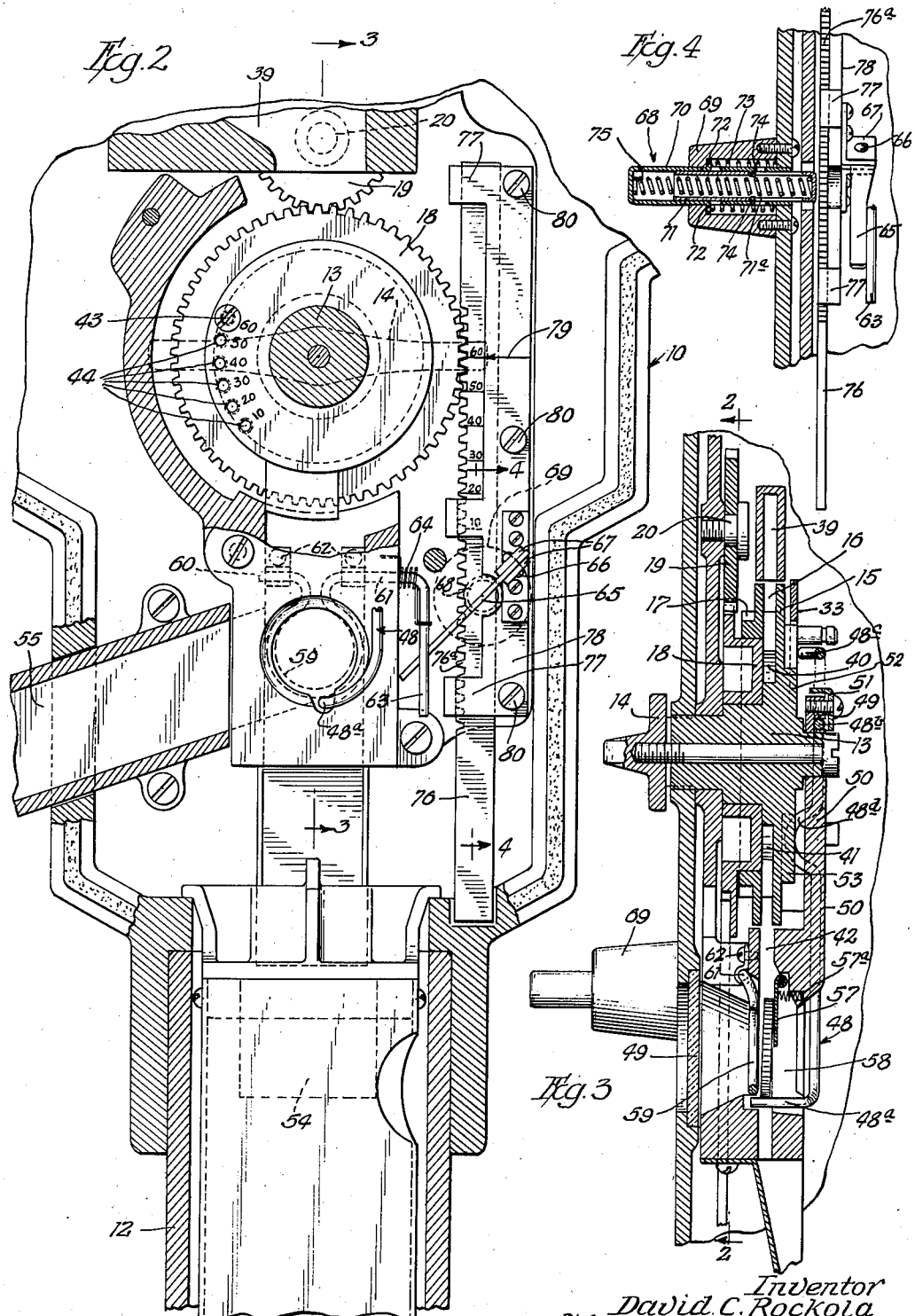
Inventor
David C. Rockola
By Sheridan, Davis & Calgill Attys.

Patented Oct. 14, 1941

2,259,177

UNITED STATES PATENT OFFICE 2,259,177

PARKING METER

David C. Rockola, Chicago, Ill., assignor to National Park-O-Graf Corporation, Chicago, Ill., a corporation of Illinois Application July 12, 1937, Serial No. 153,103

7 Claims. (Cl. 194—61)

This invention relates to improvements in parking meters.

The use of metered parking space generally requires the insertion of a token or coin in a meter for setting the meter mechanism in position for indicating the beginning of a parking period. Inasmuch as the use of such meters is not merely for purposes of revenue but also for effecting the orderly regulation of traffic and discouragement of the occupancy of parking space by some motorists for extended periods of time to the exclusion and inconvenience of others, it is recognized that frequently parking meters as heretofore constructed and used have penalized such motorists who have desired to park but a short time as compared with those who make use of a metered parking space for a longer time or for the full parking period accorded by municipal regulations. For example, meters at present in use require the insertion of a coin such as a five-cent piece whether the motorist wishes to park five minutes or less or whether he intends to use the space for the full alloted time, such as an hour. Frequently a motorist wishes to park a minute or two while he steps into a store or other establishment to make a purchase, for example. Requiring a motorist on such a mission to pay the same amount that would be required were he to park the full allotted time appears equitable and in fact frequently encourages such motorist to delay his departure since there is no inducement to relinquish to another the space and period for which he has paid. In such instances, few as they may be, parking meters have not heretofore rendered the metered areas as useful to the greatest number of motorists as would be the case were some provision made to induce a motorist to relinquish his space at the earliest possible moment.

It is an object of the present invention to provide a parking meter which, while it requires the insertion of a token or coin at the beginning of a parking period regardless of the intended duration of use of the area, will release or refund the coin to the motorist at any time during a relatively short period after the coin is inserted whereby motorists who actually require the use of the space for such short periods are induced to accept a refund of their coins and relinquish the space to others. In other words, it is an object of the present invention to provide a coin freed parking meter which provides a free parking period.

It is of advantage to the regulation of traffic that the meter mechanism be adjustable for varying the duration of the parking period since in some localities of a municipality, a parking period of an hour may be unobjectionable while in other streets the parking period may be only a half hour, for example. Meters having such adjustable mechanisms may be set for the predetermined periods at the time of installation and may be altered after trial as warranted or required by traffic conditions which, of course, may vary with the seasons. It will be obvious that meters providing free parking periods which may also be varied as traffic conditions warrant will further facilitate the orderly regulation of traffic. For example, meters on a street may be set to permit a five-minute or even ten-minute free parking period in conjunction with a total parking period of one hour during a season where traffic in such street is not excessive. At another season or on another street where traffic is heavier or during some special event which increases traffic in such street, it may be desirable to reduce the full parking period to a half hour and the free parking period to three minutes.

It is another object of the invention, therefore, to provide a meter mechanism which is adjustable for varying the duration of a free parking period whereby such free parking period can be correlated or coordinated with a total parking period which is likewise preferably rendered variable by adjustment of the meter mechanism.

Other objects of the invention relate to various features of construction and arrangement of parts which will be apparent from a consideration of the following specification and accompanying drawings, wherein:

Fig. 2 is a vertical sectional view of the parking meter shown in Fig. 1 taken on the plane indicated generally by lines 2—2 of Fig. 3;

Fig. 3 is a broken sectional view taken on line 3—3 of Fig. 2; and

Fig. 4 is a broken sectional view taken on line 4—4 of Fig. 2.

Figure 1:
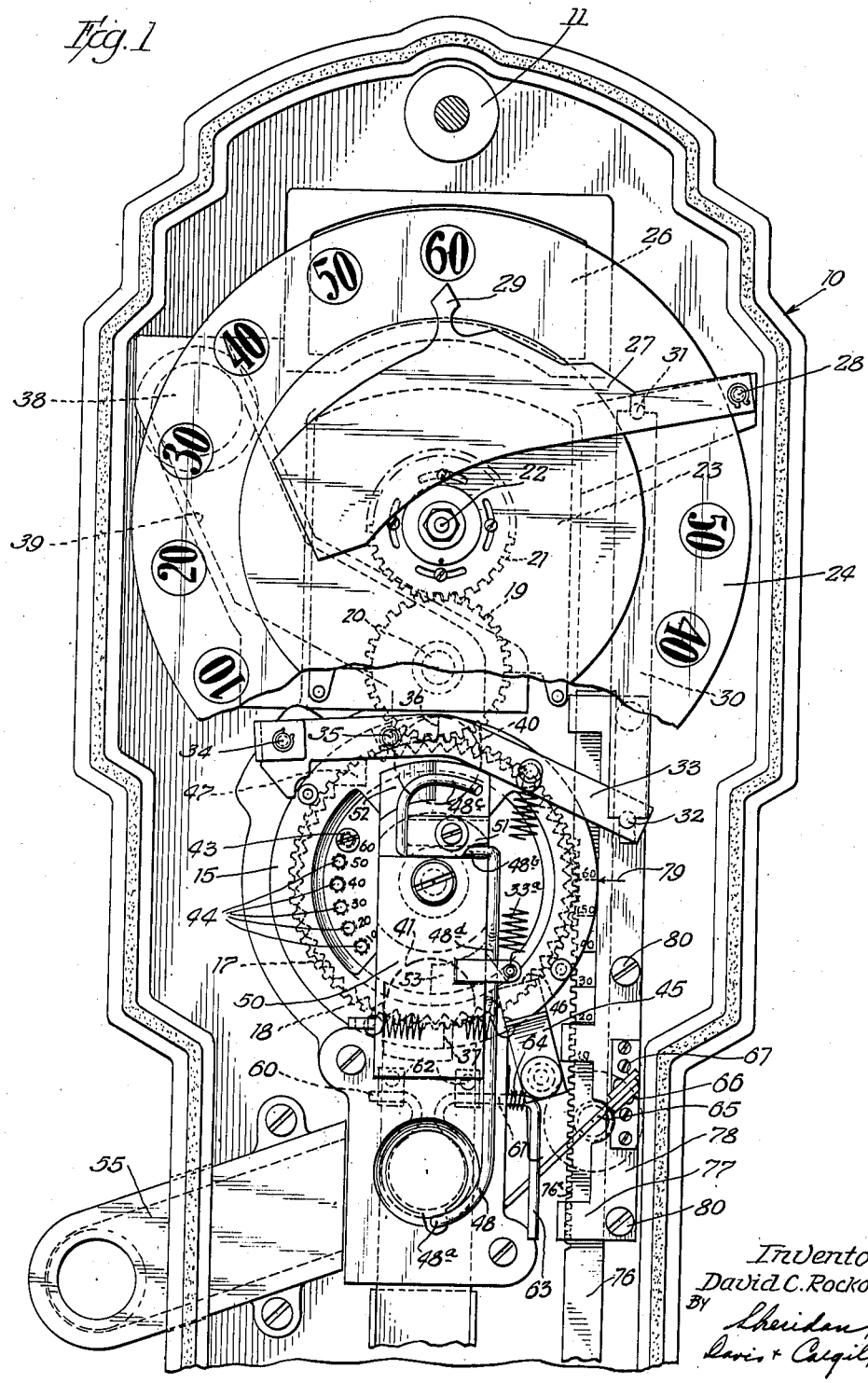
Fig. 1 is a broken rear elevation of a parking meter embodying the present improvements, a hinged section of the meter casing being removed or lowered to disclose the mechanism more clearly.

The meter mechanism disclosed in the accompanying drawings comprises generally coin freed mechanism which, when operated at the beginning of a parking period, energizes a driving or timing means for a parking period indicator and simultaneously releases from arrested position the coin used previously in freeing the mechanism and effects the discharge of such coin into a coin receiving receptacle. The present coin freed mechanism, the parking period indicator and the means for driving the same as well as the coin arresting device and other features of the meter are more fully shown and described in my copending applications, Serial No. 71,088, filed March 27, 1936, now Patent No. 2,171,345, issued August 29, 1939, and Serial Nos. 82,863 and 82,864, the latter having issued on September 13, 1938, as Patent No. 2,130,155, and both filed June 1, 1936.

In the accompanying drawings, the meter mechanism is provided with a casing indicated generally by the numeral 10 and has a section hinged at the bottom which may be opened to provide access to the meter mechanism for adjusting the same or for removing the coins, a lock 11 being provided at the upper end of the casing 10 for locking the sections together. The casing is shown as being mounted on a pillar or post 12 which in turn, in accordance with conventional practice, may be mounted at the curb adjacent the space to be controlled by the meter.

Mounted within the casing 10 is a rotary member indicated generally by the numeral 13 and which is provided with an exterior handle or lever 14 by means of which it may be operated in setting and energizing the meter at the beginning of a parking period. The member 13 constitutes a portion of the coin freed mechanism of the meter and is provided with a circumferential flange or disc 15 on one side of which is provided ratchet teeth 17.

Mounted on the member 13 for rotation relatively thereto is a gear 18 having teeth at its periphery which mesh with a gear 19 journaled at 20 which in turn meshes with or engages a gear 21 which drives a shaft 22 of a timing device such as a clock work mechanism. The clock work mechanism is indicated generally by the numeral 23 in Fig. 1. When the gear 18 is rotated counter clockwise as viewed in Fig. 1, the gears 19 and 21 will likewise be actuated for winding up the clock work mechanism and for resetting the parking period indicator 24 which is carried by the shaft 22. In other words, as the clock mechanism is wound, the indicator 24 which, in the embodiment shown is in the form of a disc having suitable indicia thereon, will be rotated to the position shown in Fig. 1 and as the clock mechanism operates, the indicator will be rotated clockwise as viewed in Fig. 1 and will indicate through window openings 26 in opposite walls of the meter casing (only one of which is shown in Fig. 1) the remainder of the parking period. If desired, this mechanism may be provided with additional indicia thereon such as shown at the right hand side of the member 24 in Fig. 1 for indicating a permissible or non-permissible overtime parking period as more fully described in my Patent No. 2,171,345 above referred to.

When the period indicator 24 is being rotated to the position indicated in Fig. 1 as above mentioned, shutters 27 on opposite sides of the member 24 and which are pivotally supported at 28 will be elevated to obstruct the view of the member 24 through the windows 26 until the indicator has been properly set. The shutters thus serve to indicate to the patron whether he has or has not actuated the lever 14 through the required arc. Failure to operate the lever 14 through the required arc, for example, 180° would, of course, deprive the patron of his full allotted parking period. The shutters 27 may be provided with pointers 29 which occupy the position shown in Fig. 1 when the mechanism has been properly set in position at the beginning of a parking period. For elevating the shutters 27, a link 30 is pivotally attached thereto at 31 and at its lower end is attached at 32 to a lever 33 which is pivoted at 34 to a stationary portion of the mechanism. The lever 33 is arranged to elevate the shutters 27 into the view obstructing position above described upon initial operation of the coin freed mechanism and to effect the return of the shutters to the position shown in Fig. 1 when the meter has been properly set.

The lever 33 also serves as a lock to prevent the operation or setting of the meter without first inserting a coin therein. For so locking the coin freed means against operation until a coin has been inserted, a pin 35 carried by the lever 33 is arranged to project into one of two slots 36 and 37 in the flange 15, depending upon which slot is uppermost. These slots are of sufficient length circumferentially to permit of a desirable limited arcuate movement of the member 13 when the handle 14 is operated even though no coin has been inserted, such movement being insufficient, however, to effect winding of the indicator mechanism.

When a patron desires to set the mechanism he inserts a coin or token in a coin receiving passage 38 formed in the casing 10, communicating with which is a coin chute 39 which conducts the coin into one of two coin receiving recesses 40 and 41 provided in the member 13 each communicating with the slots 36 or 37, respectively. As shown in Fig. 1, a coin which is shown in dotted lines in the coin recess 40 will act as a cam to elevate the pin 35 from the slot 36 upon the initial movement of the member 13 in counter clockwise direction as viewed in Fig. 1 and in Fig. 2. After the elevation from the slot, the pin will descend upon the periphery of the disc or flange 15 and will drop into the opposite slot 37 when the lever 14 has been rotated through an arc of 180°. Thus, it will be seen that when the lever 14 is operated, the lever 33 will be moved counterclockwise as viewed in Fig. 1 and lift the shutters 27 to view-obstructing position during the setting of the indicator 24 and the energization of the indicator operating mechanism 23. As the pin 35 drops into the slot 36 or 37 at the end of a meter setting operation, the shutters will, of course, return to the position shown in Fig. 1 by gravity or by means of a spring 33a.

As the member 13 is rotated after the insertion of a coin as above described, the coin will be carried by said member into registration with a coin receiving passage 42 shown in Fig. 3, and will drop into said passage. During such movement of the coin, it will engage a pin or screw 43 which is carried by the gear 18 and which projects into the path of the moving coin whereby the coin acts as a key between the member 13 and the gear 18 to effect rotation of the latter in counterclockwise direction, as viewed in Fig. 1, and thereby effect rotation of gears 19 and 21 for effecting the setting of the indicator 24 and the energization of the indicator operating mechanism 23 as above described.

The member 43 may be moved from the position shown in Fig. 1 to any one of several other positions determined by the additional receiving openings 44 whereby the arc may be varied through which the gear 18 will be driven during the meter setting operation as a result of which the indicator 24 will be operated through a correlative arc. Thus, by setting the pin or screw 43 in the opening 44 associated with the indicia "50," the indicator 24 will be rotated from 0 position to a position where the indicia "50" of the member 24 will register with the pointer or pointers 29. Other adjustments are provided for the member 43 for varying the duration of the parking period as may be desired. This feature of the present improvements is more fully described in my Patent No. 2,171,345, above mentioned.

A spring pressed pawl 45 is provided which coacts with the ratchet teeth 17 for preventing reversal of movement of the lever 14 during the setting operation of the meter. The pawl 45 seats normally in one of two enlarged notches or recesses 46 or 47 which enable the handle 14 and the member 13 to be initially rotated the short distance required for causing the inserted coin or token to effect the elevation of the pin 35 from the notch 36 or 37 in which it may be located for effecting the freeing of the member 13.

As shown and described more fully in my Patent No. 2,130,155, a coin dropping into the coin receiving passage 42 is arrested by means of a coin arresting member such as the member indicated generally by the numeral 48 which, as shown in Fig. 3, is in registration with opposite sight windows 49, only one of which appears in said figure. By arresting the token or coin in position where it is visible through either of the windows referred to, the use of bogus or spurious coins is discouraged.

The coin arresting member 48 comprises a rod having its lower end 48a directed inwardly across the passage 42 for arresting the coin that drops from the member 13. The member 48 is pivotally mounted at a horizontally extending transverse portion 48b, which portion is located in a recess 49 provided in a plate 50. A removable clip 51 retains the portion 48b in position. The upper end of the member 48 is provided with a suitably shaped cam engageable portion 48c as shown in Fig. 1 while a similarly shaped cam engageable portion 48d is provided a suitable distance beneath the pivotal portion 48b as shown in Fig. 3. The adjacent face of the rotatable member 13 is provided with two cam surfaces 52 and 53 which cooperate with the cam engageable portions 48c and 48d in pivotally swinging the member 48 about its pivoted portion 48b to cause the coin arresting portion 48a to move outwardly or to the right as viewed in Fig. 3 to release a coin and permit it to drop into a coin receptacle 54 and to return the coin arrester to the position shown. Thus, during the movement of the member 13 through an arc of 180° in setting the meter, one of the cam surfaces (cam surface 53 as shown in Fig. 1) will engage the portion 48d of the member 48 and effect the release of the arrested coin and promptly thereafter and before the next coin is deposited in the passage 42, the same cam will engage the portion 48c of the member 48 and return the member 48a to the position shown in Fig. 3 for arresting the last used coin as it drops into said passage. Upon the succeeding operation of the member 13, the other cam surface 52 will effect the operation of the member 48 for releasing the previously inserted coin and arresting the actuating coin.

In providing a meter of the character above described with mechanism capable of providing a free parking period of limited duration, mechanism is provided for returning the coin from the arrested position shown in Fig. 3 to the patron provided he returns to the meter within a predetermined period with the intention of relinquishing his space.

As shown in Figs. 1 and 2, a coin return chute 55 may be provided which communicates with a lateral enlargement 58 of the passage 42. An arrested coin is held in the position shown in Fig. 3 by means of an arm 57 held normally in vertical position by a light spring 57a. The arm 57 normally retains the coin in substantially the position shown in Fig. 3 whereby the coin will drop vertically downwardly when the member 48a is moved to non-arresting position. A coin shifting device 59 which may be in the form of a wire loop so as to avoid obstructing the view of the arrested coin, is provided with laterally extending arms 60 and 61 pivotally secured to a stationary portion of the structure by means of clips 62. The arm 61 is provided with a depending extension or lever 63. A light spring 64 shown in Fig. 1 tends to restore the member 59 to the vertical position shown in Fig. 3 when the same has been swung to the right or counter clockwise as viewed in Fig. 3 in shifting a coin in the space 58 for discharge into the communicating chute 55. The light spring 57a permits the arm 57 to swing to the right as the coin is shifted by the member 59. For swinging the coin shifter 59 in the manner stated, a lever 65 may be provided which, as shown, is pivoted at 66 to ears 67 carried by a stationary portion of the structure. The lever 65 as shown in Fig. 1 contacts the arm 63 of the member 59 and is adapted to swing the same against the action of spring 64 to the right as viewed in Fig. 3 as stated.

For operating the lever 65, suitable mechanism in the form of a plunger indicated generally by the numeral 68 may be provided which extends exteriorly of the casing and is guided in its movements by a recessed boss or bearing 69 shown in Figs. 3 and 4. The plunger 68 in the form illustrated comprises a tubular member 70 telescopically arranged on a second tubular member 71, the inner end of which is projectable through a recess in the casing into contact with the lever 65 for swinging the same in the manner stated for effecting the rotation of a coin.

As shown in Fig. 4, the member 70 is provided with outwardly struck lugs 72 which limit the outward movement of the member 70 from the boss 69 and form a seat for a spring 73 which restores the plunger member 70 to the position shown in Fig. 4 after depression of the same and release thereof. The inner end of the member 70 is provided with inwardly directed lugs 74 which project into longitudinal slots 71a provided in the member 71 and in cooperation with the outer ends of said slots limit the inward movement of the member 71 by a spring 75 confined between the closed ends of the two members 70 and 71. The spring 75 is sufficiently stiff to actuate the lever 65 as described but provides for the telescopic action of the member 70 upon the member 71 in the event the inward movement of the member 71 is obstructed.

In order to prevent the operation of the lever 65 to effect a refund or discharge of a coin from the machine except within a predetermined interval after the insertion of a coin into the meter and the setting of the same, means are provided for obstructing the inward movement of the member 71, which means are coordinated with the timing mechanism of the meter. Thus, in the embodiment of the invention herein disclosed, a slidable bar 76 is provided which is guided in its reciprocatory movements by any suitable means such as the guide fingers 77 carried by the member 78. The bar 76 is provided with teeth 76a which are arranged for engagement with the teeth of the gear 18 as shown in Fig. 2.

When a coin has been inserted in the machine and the handle 14 operated in setting the meter at the beginning of a parking period, the gear 18 is operated counterclockwise as viewed in Fig. 2 and hence elevates the bar 76. In so elevating the bar, the lower end thereof will move to a position above the plunger 68 and out of the path of movement of the inner plunger member 71. Hence, it will be seen that during the period that the bar 76 is in non-obstructing position, the plunger 68 may be actuated for operating lever 65 and effecting the discharge of the coin through the chute 55. Since the gear 18 is rotated in a clockwise direction by the clock work mechanism during the parking period, the bar 76 will be lowered and again moved into position between the end of the plunger 71 and the lever 65 to prevent subsequent release of a coin. Since the arc of rotation of the gear 18 depends on the location of the adjustable pin 43, it will be seen that the height to which the bar 76 will be lifted depends on the setting of the meter in determining the parking period.

As shown in the drawings, the meter mechanism is arranged to provide for sixty-minute parking which may be assumed to provide a period of five minutes after the setting of the meter during which the patron may return and operate plunger 68 to obtain a refund of his coin. Should the adjustable pin be shifted to one of the other positions provided for shortening the parking period say to fifty minutes, the free parking period would likewise be shortened due to the reduction in the arc of movement of the gear 18 and the consequent lesser elevation of the bar 76. Since it may be desirable to provide, for example, a five minute free parking period with a sixty or fifty or forty-minute parking period, the bar 76 may be adjusted vertically with reference to the gear 18 to provide a free parking period of five minutes regardless of the length of the metered parking priod.

As shown in Fig. 2, the bar 76 is provided with graduations corresponding to the indicia on the gear 18, hence when the pin 43 is in the position shown in said figure and the bar 76 is so meshed with said gear that the graduation "60" is in alignment with the arrow 79, a free parking period of five minutes will be provided while the main or metered parking period is one hour. Should the member 43 be adjusted to the next lower opening to provide a fifty-minute parking period, the bar 76 should be elevated so that the graduation marked "50" is in alignment with the arrow 79 when the mechanism is in a position of rest. Such adjustment will provide a five-minute free parking period. Corresponding adjustments may be made to correlate the free parking period with the shorter metered parking periods as will be seen. To effect the shifting of the bar 76 as described, the member 78 may be released by unscrewing the mounting screws 80 and adjusting the bar as may be described. Should it be desirable to shorten the metered parking period from sixty to fifty or forty minutes, for example, and to shorten the free parking period correspondingly, the bar 76 may be so adjusted by shifting it the extent necessary. This arrangement thus enables the free parking period control mechanism to be correlated with the parking period indicator as may be desired.

In accordance with the present invention, it will be seen that a patron who wishes to use a parking space but a few minutes will insert a coin or token in the usual manner and set the meter. If he returns within the predetermined free parking period and operates the plunger 68, the coin which he inserted will be returned to him. The absence of a coin in the arrested position shown in Fig. 3 will indicate that the previous occupier of that space has received a refund of his coin and is no longer entitled to occupy the space. Hence, one occupying a meter space, the meter of which is operating, may not properly do so without inserting a coin and resetting the meter so that his coin is visible through the sight windows 49. The windows, therefore, not only serve to discourage the use of spurious coins but also discourage cheating as by a motorist setting the meter and immediately obtaining a refund of his coin without vacating the space. Since spurious coins may be employed for operating the parking meter, the arrangement described wherein the coin inserted by the patron may be returned to him is preferred, whereby, in the event a spurious coin is used in operating the meter, such fraudulent practice will not be rewarded by the return of a valid coin as might be the case where the refund made from coins previously deposited in the coin box.

While I have shown and described a particular embodiment of my improvements for the purpose of illustration, it will be seen that various changes may be made in the illustrative mechanism herein shown and described without departing from the spirit of the invention.

I claim:

1. A parking meter comprising a parking period indicator, means for operating said indicator, means freeable by an inserted coin for energizing said operating means, means for discharging said coin from the meter, and means controlled by said operating means for rendering said discharging means ineffective to discharge the coin after a predetermined initial portion of said period.

2. A parking meter comprising a parking period indicator, means for operating said indicator, means freeable by an inserted coin for energizing said operating means, manually operable means for discharging from the meter an inserted coin within a predetermined initial portion of a parking period, and means controlled by said operating means for preventing the discharge of a coin after said initial portion of the respective parking period.

3. A parking meter comprising a parking period indicator, coin freed means for setting said indicator in position for indicating the beginning of a parking period, operable means adapted to effect the refund of a coin from the meter during a predetermined initial portion of the parking period, and means synchronized with the operation of said indicator for rendering said refunding means ineffective after said initial portion of the parking period.

4. A parking meter comprising a parking period indicator, timing means for operating the same, coin freed means for effecting the energization of said timing means, operable means for effecting the refund of a coin from said meter during an initial portion of a parking period, and means controlled by said timing means for rendering said refunding means ineffective after said initial portion of the parking period.

5. A parking meter comprising a parking period indicator, means for operating the same, means for varying the length of the parking period indicated by said indicator, coin freed means for effecting the energization of said indicator operating means, means rendering a coin refundable from said meter during a predetermined initial portion of the parking period, and means for varying the length of the initial portion of the parking period during which a coin is refundable.

6. A parking meter comprising a parking period indicator, means for actuating the indicator during a parking period, a gear, coin freed means for operating said gear in one direction for effecting the energization of said actuating means, said gear being operable in the opposite direction by said coin freed means, means for discharging a coin from the meter, a member manually operable from the exterior of the meter for actuating said coin discharging means, and an obstructing member for said manually operable member provided with a rack meshing with said gear and operable by the latter to inoperative position during the energization of said indicator actuating means and operable in the opposite direction by said gear upon operation of the same by said actuating means for moving said obstructing member into obstructing position with respect to said manually operable member for preventing the actuation of the coin discharge means after a predetermined initial portion of the parking period.

7. A parking meter comprising a parking period indicator, driving means therefor, operable means freeable by an inserted coin, manually operable means for discharging an inserted coin from the meter, movable means for obstructing the effectual operation of said coin discharge means, and mechanism operable in one direction by said coin freed operable means for effecting the energization of said driving means and for moving said obstructing means to an inoperable position at the beginning of a parking period and operable in the opposite direction by said driving means for effecting the movement of said obstructing means to operative position upon the termination of a predetermined initial portion of a parking period.

DAVID C. ROCKOLA.